United States Patent [19]

Novak

[11] Patent Number: 4,561,207

[45] Date of Patent: Dec. 31, 1985

[54] PIN RELEASE FOR ANIMAL TRAP

[75] Inventor: Milan Novak, Aurora, Canada

[73] Assignee: Her Majesty the Queen in Right of Canada, as represented by the Minister of Natural Resources, Toronto, Canada

[21] Appl. No.: 606,211

[22] Filed: May 2, 1984

[30] Foreign Application Priority Data

May 6, 1983 [GB] United Kingdom ................. 8312477

[51] Int. Cl.[4] ............................................. A01M 23/24
[52] U.S. Cl. ............................................. 43/87; 43/93
[58] Field of Search ................. 43/87, 85, 86, 92, 93, 43/94; 24/582, 584, 658

[56] References Cited

U.S. PATENT DOCUMENTS 1,884,499 10/1932 Alston ...................................... 43/93
2,647,294 8/1953 Davis ....................................... 24/658
4,329,805 5/1982 Novak ...................................... 43/87

FOREIGN PATENT DOCUMENTS 1112042 11/1981 Canada ................................... 43/86

Primary Examiner—Kuang Y. Lin
Assistant Examiner—Kurt Rowan
Attorney, Agent, or Firm—Sim & McBurney

[57] ABSTRACT

A mechanism retains and releases the end of a swing-arm of an animal trap. The trap has a frame to which the swing-arm is mounted. Part of a trip-pan extends perpendicularly from the frame and engages it, being pivotable about the location of its engagement. An elongated release pin engages that part of the trip-pan at a location spaced from the frame, and the frame has as a support tab extending from it with an aperture through which one end of the pin extends. Part of the end extending through the tab engages the swing-arm when the trip-pan is swung toward the swing-arm, but disengages from the swing-arm when the trip-pan is swung away from the swing-arm.

7 Claims, 4 Drawing Figures

PIN RELEASE FOR ANIMAL TRAP

This invention relates generally to animal traps, and has to do particularly with a humane animal trap which is capable of entrapping an animal without causing damage or excessive pain to the animal.

BACKGROUND OF THIS INVENTION

It is known to construct an animal trap having an elongated frame, a swing arm adapted to swing from a horizontal position lying along the arm, upwardly in a vertical plane to a position about 180° away from its initial position. During its upward swing, the arm places tension upon a cable of which the end is formed in a sliding loop. The loop is laid on top of a trip pan, and the trip pan, when it is depressed by the weight of an animal, releases the swing arm to swing upwardly and tighten the sliding loop around the paw or foot of the animal. The other end of the cable is of course attached to a tree, stake or other permanent item. A spring is normally provided to bias the swing arm upwardly away from its normal "set" position in which it lies along the elongated frame.

GENERAL DESCRIPTION OF THIS INVENTION

The aim of the present invention is to provide a construction of a simplified nature for a humane trap of ths kind. More particularly, the aim of this invention is to provide a humane trap construction in which it is not necessary to provide additional structure to protect any parts from the animal. The activating mechanism is therefore fully exposed, but its construction is such that it does not need to be protected from the animal.

Further, the trap of this invention is designed to utilize a minimum number of moving pieces, and these are very simple and cheap to manufacture.

Accordingly, this invention provides a mechanism for retaining and releasing the end of a swing-arm of an animal trap, the trap having a frame to which the swing-arm is pivotally mounted, the mechanism comprising:
- a trip-pan having a portion engaging the frame, extending generally perpendicular therefrom, and adapted to pivot about the location of its engagement with the frame,
- an elongated pin engaging the said portion at a location spaced from the frame,
- support means extending from the frame and having aperture means through which one end of the pin extends,
- part of said one end engaging the swing-arm when the said portion of the trip-pan is swung toward the swing-arm, but disengaging from the swing-arm when the said portion is swung away from the swing-arm, the pin having a reduced-diameter groove adjacent its other end, the trip-pan including a substantially flat part, with respect to which the said portion extends substantially perpendicularly, the said part and portion being connected at a knee region, a pin slot in said knee region, the slot including in said substantially flat part an enlarged portion big enough to receive the said other end of the pin, the slot including in said portion a narrower portion big enough to be engaged by said reduced-diameter groove, but too small to receive the part of the pin beside the groove, said portion of the trip-pan having a tongue extending therefrom at an obtuse angle and defining a wider portion at either side of the tongue, the frame having a tongue slot through which the tongue engages, the tongue slot being sufficiently narrow to prevent removal of the tongue after the tongue has been inserted with the tongue perpendicular to the frame, and then rotated to bring the said portion of the trip-pan perpendicular to the frame, the said other end of the pin engaging under the said portion of the trip-pan, to prevent the trip-pan from being rotated to a position at which the tongue can be withdrawn from the tongue slot.

This invention further provides a method of assembling a mechanism for retaining and releasing the end of the swing-arm of an animal trap, the trap having a frame to which the swing-arm is pivotally mounted, and the mechanism including a trip-pan having a portion engaging the frame, extending generally perpendicular therefrom, and adapted to pivot about the location of its engagement with the frame; an elongated release member engaging the said portion at a location spaced from the frame; support means extending from the frame and having aperture means through which one end of the release member extends; part of said one end engaging the swing-arm when the said portion of the trip-pan is swung toward the swing-arm, but disengaging from the swing-arm when the said portion is swung away from the swing-arm; the release member having the form of a pin with a reduced-diameter groove adjacent its other end, the trip-pan including a substantially flat part, with respect to which the said portion extends substantially perpendicularly, the said part and portion being connected at a knee region, a pin slot in said knee region, the slot including in said substantially flat part an enlarged portion big enough to receive the said other end of the pin, the slot including in said portion a narrower portion big enough to be engaged by said reduced-diameter groove, but too small to receive the part of the pin beside the groove; the said portion of the trip-pan having a tongue extending therefrom at an obtuse angle and defines a shoulder portion at either side of the tongue, the frame having a tongue slot through which the tongue engages, the tongue slot being sufficiently narrow to prevent removal of the tongue after the tongue has been inserted with the tongue perpendicular to the frame, and then rotated to bring the said portion of the trip-pan perpendicular to the frame; the support means being a stiff tab adapted to be permanently deformed generally away from the frame; the method comprising the steps:
- (a) inserting said other end of the pin through the enlarged portion of the pin slot to bring the reduced-diameter groove into alignment with the slot,
- (b) sliding the reduced-diameter groove along the narrower portion of the pin slot while swinging the pin around the knee region,
- (c) inserting the tongue through the tongueslot with the tongue oriented subtantially perpendicular to the frame, then rotating the trip-pan to bring the said portion thereof perpendicular to the frame,
- (d) and engaging the said one end of the pin with the aperture means of said tab.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
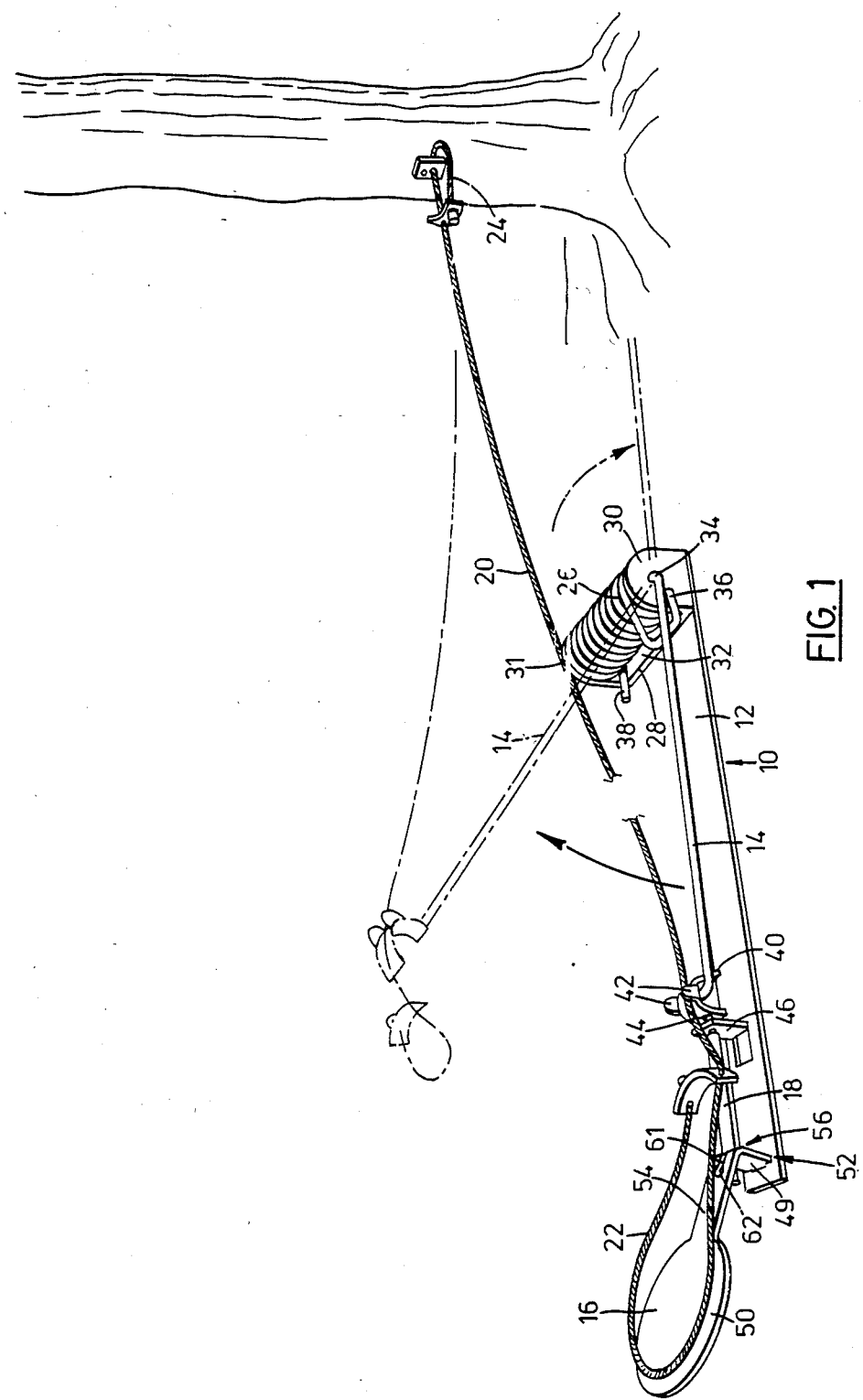
FIG. 1 is a perspective view of an animal trap embodying the present invention.

Attention is first directed to FIG. 1, in which an animal trap 10 is seen to include a frame 12, a swing arm 14, a trip pan 16, a pin release member 18, a cable 20 formed into a sliding loop 22 at one end and having a loop 24 at the other end for securement to a tree or the like, and a coil spring 26. The coil spring 26 is mounted within a bracket 28 having two upstanding portions 30 and 31, and a base 32 secured to the frame 12. The swing arm 14 has a right-angled bend at 34 and passes through an opening in the portion 30 and over to an equivalent opening in the portion 31. This forms a hinge axis about which the swing arm 14 is adapted to pivot. The spring 26 has a first end 36 urging upwardly against the swing arm 14, and a second end 38 pressing downwardly against the base 32 of the bracket 28.

At its leftward end, the swing arm 14 supports a saddle member 40, having two upstanding tabs 42, which act as guides to keep the cable 20 entrained over the saddle 40. The saddle 40 is preferably welded to the end of the swing arm 14, which is bent through 90° for this purpose.

At its leftward extremity, the saddle member 40 has an opening 44 into which the reduced end of the pin release member 18 can be received, in order to retain the swing arm 14 in the position shown in FIG. 1. The pin release member 18 extends through a tab 46 struck from the material of the frame 12 and extending upwardly at right angles to the frame 12.

The leftward end of the pin release member as shown in FIG. 1 is supported in a portion 49 of the trip pan 16, which not only holds the end of the pin release member 18 in position above the frame 12, but also pulls leftwardly on the pin release member when an animal steps downwardly on the leftward rounded portion 50 of the trip pan 16, thus swivelling the trip pan 16 about its loose connection to the frame 12, shown at the numeral 52.

Figure 2:
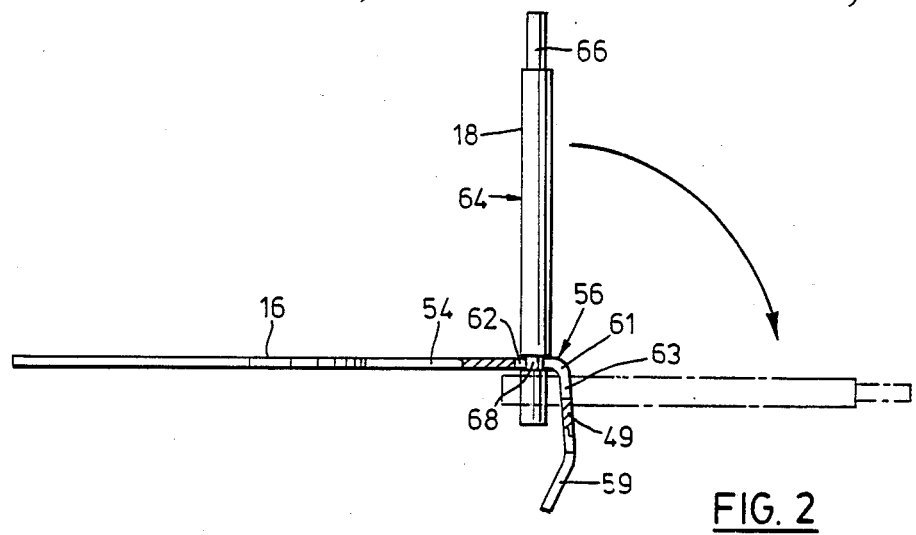
FIG. 2 is a view of two of the movable components, showing a first stage in the assembly of the trap.
Figure 3:
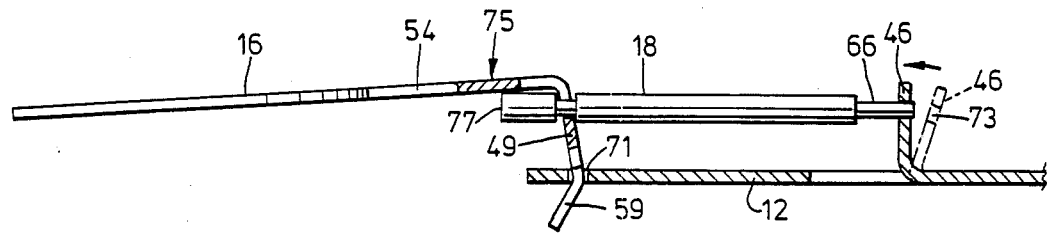
FIG. 3 is a view similar to FIG. 2, showing a second stage in the assembly of the trap.
Figure 4:
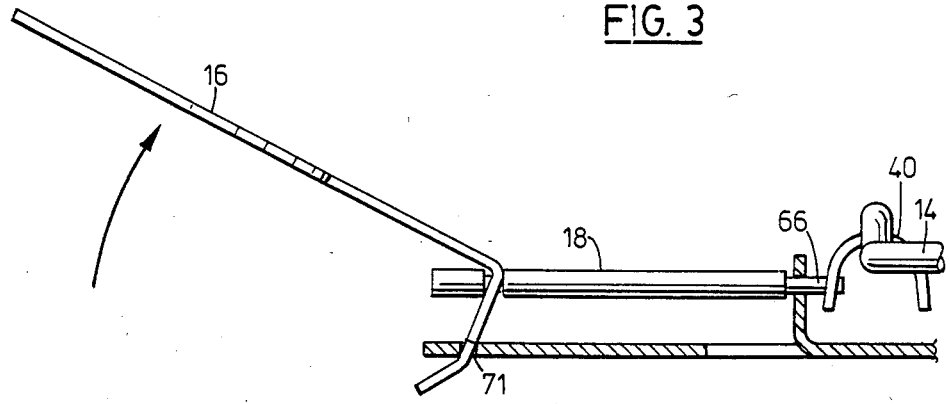
FIG. 4 is a sectional view through a portion of the trap after it has been completely assembled, and in its "set" condition.

Attention is now directed to FIGS. 2-4 for a more detailed discussion of the interaction between the trip pan 16, the pin release member 18, the tab 46 and the saddle member 40.

As can be seen in FIG. 2 (and FIG. 1), the trip pan 16 has an arm portion 54 which undergoes a bend at 56, continuing as the portion 49. At the bottom of the portion 49, the width decreases to provide a bent tongue 59 extending downwardly and leftwardly at an angle, as seen in FIG. 2. The tongue 59 thus projects downwardly from a wider part of the portion 49, as can be seen in FIG. 1.

At the location of the bend 56, the arm 54 of the trip pan 16 has a key-shaped slot 61, which incorporates a rounded portion 62 of larger diameter, and a narrower portion 63 extending leftwardly and around the bend region 56. The pin release member 18 has a basic outer diameter shown at 64, but has a reduced portion 66 at one end, and has a reduced groove 68 adjacent but spaced from the other end. This is clearly shown in FIG. 2. The large or main diameter 64 of the pin 18 is able to pass through the enlarged portion 62 of the slot 61, but cannot pass through the narrow extension of the slot which follows around the bend region 56. However, the reduced groove 68 is sized in such a way that, once it is aligned with the reduced portion of the slot 61, it can be slipped around to the position shown in broken lines in FIG. 2 and in solid lines in FIG. 3.

FIG. 3 illustrates the leftward end of the frame 12 and shows in broken lines the position of the tongue 46 when it is first struck from the frame 12. It can be seen that the tongue bends through more than a right angle to define an obtuse angle extending obliquely upwardly and to the right at this stage in the assembly.

Also in FIG. 3, it can be seen that the reduced-width tongue 59 at the bottom of the portion 49 of the trip pan 16 is adapted to extend through a relatively loose slot 71 close to but spaced from the leftward end of the frame 12. While the slot 71 is somewhat loose with respect to the tongue 59, it is such that, once the tongue 59 has been pushed through the slot 71 and the tab 46 is straightened up to extend perpendicularly upwardly from the frame 12, the tongue 59 cannot be withdrawn. In order to withdraw the tongue 59, the trip pan 16 has to be rotated in the counter-clockwise direction as seen in FIG. 3, to a position further around than that illustrated in FIG. 3.

During assembly, after the pin release member 18 has been inserted into the slot as shown in FIG. 2, and then rotated around to the position shown in FIG. 3 and aligned with the tab 46, the tab 46 is deformed leftwardly so that its aperture 73 registers with the reduced end 66 of the pin release member 18. This effectively holds the pin release member 18 in a position in which it lies above the frame 12 and substantially parallel thereto. In this position, there is mechanical interference between the region identified by the arrow 75 on the arm 54 of the trip pan 16, and the leftward end 77 of the pin release member 18. This prevents the trip pan 16 from rotating further counter-clockwise from the position shown in FIG. 3, and thus it is not possible for the trip pan 16 to reach a position in which the tongue 59 can disengage from the slot 71 in the frame 12. By virtue of this arrangement, all parts are securely anchored in place, but it is possible for the trip pan 16 to be moved in the clockwise position up to a "set" condition as shown in FIG. 4. By rotating the trip pan 16 to the position shown in FIG. 4, the pin release member 18 is moved to the right, and the reduced portion 66 of the pin release member can engage the opening 44 in the saddle member 40, as seen in the figure. In this position, the pin release member 18 will hold the swing arm 14 in the "set" position shown in FIGS. 1 and 4. When an animal steps on the rounded pan portion 50 of the trip pan 16, the trip pan 16 will swing in the counter-clockwise direction about the slot 71, thus withdrawing the pin release member 18 from engagement with the saddle 40, thus releasing the swing arm 14 to be swung upwardly through an arc and place tension on the cable 20. This will ensnare the paw or leg of the animal which has stepped on the trip pan 16.

While one specific embodiment of this invention has been illustrated in the accompanying drawings and described in the foregoing disclosure, it will be apparent to those skilled in the art that changes and modifications may be made therein, without departing from the essence of this invention.

I claim:

1. A mechanism for retaining and releasing the end of a swing-arm of an animal trap, the trap having a frame to which the swing-arm is pivotally mounted, the mechanism comprising:

a trip-pan having a portion engaging the frame, extending generally perpendicular therefrom, and adapted to pivot about the location of its engagement with the frame, an elongated pin engaging the said portion at a location spaced from the frame, support means extending from the frame and having aperture means through which one end of the pin extends, part of said one end engaging the swing-arm when the said portion of the trip-pan is swung toward the swing-arm, but disengaging from the swing-arm when the said portion is swung away from the swing-arm, the pin having a reduced-diameter groove adjacent its other end, the trip-pan including a substantially flat part, with respect to which the said portion extends substantially perpendicularly, the said part and portion being connected at a knee region, a pin slot in said knee region, the slot including in said substantially flat part an enlarged portion big enough to receive the said other end of the pin, the slot including in said portion a narrower portion big enough to be engaged by said reduced-diameter groove, but too samll to receive the part of the pin beside the groove, said portion of the trip-pan having a tongue extending therefrom at an obtuse angle and defining a wider portion at either side of the angle and defining a wider portion at either side of the tongue, the frame having a tongue slot through which the tongue engages, the tongue slot being sufficiently narrow to prevent removal of the tongue after the tongue has been inserted with the tongue perpendicular to the frame, and then rotated to bring the said portion of the trip-pan perpendicular to the frame, the said other end of the pin engaging under the said portion of the trip-pan, to prevent the trip-pan from being rotated to a position at which the tongue can be withdrawn from the tongue slot.

2. The invention claimed in claim 1, in which the said portion of the trip-pan has a tongue extending therefrom at an obtuse angle and defines a shoulder portion at either side of the tongue, the frame having a tongue slot through which the tongue engages, the tongue slot being sufficiently narrow to prevent removal of the tongue after the tongue has been inserted with the tongue perpendicular to the frame, and then rotated to bring the said portion of the trip-pan perpendicular to the frame.

3. The invention claimed in claim 1, in which said support means is a tab struck from the frame and bent to extend generally perpendicularly away therefrom.

4. An animal trap comprising a frame, a swing-arm pivotally mounted to the frame and spring-biased so that it is urged from a first position in which it lies along the frame, to a second position in which it has swung through an arc away from the first position, a mechanism for retaining and releasing the end of the swing-arm, the mechanism including:

a trip-pan having a portion engaging the frame, extending generally perpendicular therefrom, and adapted to pivot about the location of its engagement with the frame, an elongated pin engaging the said portion at a location spaced from the frame, support means extending from the frame and having aperture means through which one end of the pin extends, part of said one end engaging the swing-arm when the said portion of the trip-pan is swung toward the swing-arm, but disengaging from the swing-arm when the said portion is swung away from the swing-arm, the pin having a reduced-diameter groove adjacent its other end, the trip-pan including a substantially flat part, with respect to which the said portion extends substantially perpendicularly, the said part and portion being connected at a knee region, a pin slot in said knee region, the slot including in said substantially flat part an enlarged portion big enough to receive the said other end of the pin, the slot including in said portion a narrower portion big enough to be engaged by said reduced-diameter groove, but too small to receive the part of the pin beside the groove, said portion of the trip-pan having a tongue extending therefrom at an obtuse angle and defining a wider portion at either side of the tongue, the frame having a tongue slot through which the tongue engages, the tongue slot being sufficiently narrow to prevent removal of the tongue after the tongue has been inserted with the tongue perpendicular to the frame, and then rotated to bring the said portion of the trip-pan perpendicular to the frame, the said other end of the pin engaging under the said portion of the trip-pan, to prevent the trip-pan from being rotated to a position at which the tongue can be withdrawn from the tongue slot.

5. The invention claimed in claim 4, in which said support means is a tab struck from the frame and bent to extend generally perpendicularly away therefrom.

6. A method of assembling a mechanism for retaining and releasing the end of the swing-arm of an animal trap, the trap having a frame to which the swing-arm is pivotally mounted, and the mechanism including a trip-pan having a portion engaging the frame, extending generally perpendicular therefrom, and adapted to pivot about the location of its engagement with the frame; an elongated release member engaging the said portion at a location spaced from the frame; support means extending from the frame and having aperture means through which one end of the release member extends; part of said one end engaging the swing-arm when the said portion of the trip-pan is swung toward the swing-arm, but disengaging from the swing-arm when the said portion is swung away from the swing-arm; the release member having the form of a pin with a reduced-diameter groove adjacent its other end, the trip-pan including a substantially flat part, with respect to which the said portion extends substantially perpendicularly, the said part and portion being connected to a knee region, a pin slot in said knee region, the slot including in said substantially flat part an enlarged portion big enough to receive the said other end of the pin, the slot including in said portion a narrower portion big enough to be engaged by said reduced-diameter groove, but two small to receive the part of the pin beside the groove; the said portion of the trip-pan having a tongue extending therefrom at an obtuse angle and providing a wider portion at either side of the tongue, the frame having a tongue slot through which the tongue engages, the tongue slot being sufficiently narrow to prevent removal of the tongue after the tongue has been inserted with the tongue perpendicular to the frame, and then rotated to bring the said portion of the trip-pan perpendicular to the frame; the support means being a stiff tab adapted to be permanently deformed and extending generally away from the frame; the method comprising the steps:

(a) inserting said other end of the pin through the enlarged portion of the pin slot to bring the reduced-diameter groove into alignment with the slot, (b) sliding the reduced-diameter groove along the narrower portion of the pin slot while swinging the pin around the knee region, (c) inserting the tongue through the tongue slot with the tongue oriented substantially perpendicular to the frame, then rotating the trip-pan to bring the said portion thereof perpendicular to the frame, (d) and engaging the said one end of the pin with the aperture means of said tab.

7. The method claimed in claim 6, in which the tab is permanently deformed toward the pin after engagement therewith, to prevent withdrawal of the pin from engagement in the aperture means.

* * * * *